United States Patent
Becker et al.

(10) Patent No.: US 8,441,953 B1
(45) Date of Patent: May 14, 2013

(54) REORDERING WITH FAST TIME OUT

(75) Inventors: Monte Becker, Northboro, MA (US); Hoai Tran, Gilroy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 309 days.

(21) Appl. No.: 12/938,910

(22) Filed: Nov. 3, 2010

(51) Int. Cl.
| | |
|---|---|
| H04L 12/56 | (2006.01) |
| H04L 12/26 | (2006.01) |
| H04L 25/02 | (2006.01) |
| H04L 25/08 | (2006.01) |
| H04L 12/28 | (2006.01) |
| H03K 17/00 | (2006.01) |
| H04B 3/32 | (2006.01) |
| H04B 3/38 | (2006.01) |

(52) U.S. Cl.
USPC ........... 370/252; 370/229; 370/389; 370/394; 370/412; 370/427; 340/2.23; 178/69 A; 178/69 B

(58) Field of Classification Search .................. None
See application file for complete search history.

(56) References Cited

U.S. PATENT DOCUMENTS

| | | | | |
|---|---|---|---|---|
| 6,246,684 | B1 * | 6/2001 | Chapman et al. | 370/394 |
| 8,036,117 | B1 * | 10/2011 | Sindhu et al. | 370/230 |
| 2002/0095512 | A1 * | 7/2002 | Rana et al. | 709/232 |
| 2006/0069793 | A1 * | 3/2006 | Li et al. | 709/231 |
| 2008/0126562 | A1 * | 5/2008 | Ludwig et al. | 709/235 |
| 2009/0080332 | A1 * | 3/2009 | Mizrachi et al. | 370/236 |
| 2012/0063318 | A1 * | 3/2012 | Boddu et al. | 370/235 |

* cited by examiner

*Primary Examiner* — Andrew Lai
*Assistant Examiner* — Albert Shih
(74) *Attorney, Agent, or Firm* — Harrity & Harrity, LLP

(57) ABSTRACT

A device reorders first cells of a first conversation; determines whether a reorder window size is exceeded a first time based on the first conversation; subjects the first conversation to a fast time out when the reorder window size is exceeded the first time; reorders second cells of a second conversation while subjecting the first conversation to the fast time out; prepares a packet based on the first conversation; and transmits the packet to a PFE of another device.

20 Claims, 7 Drawing Sheets

REORDERING WITH FAST TIME OUT

BACKGROUND

Computing and communication networks typically include various devices, such as routers, switches or gateways, which transfer or switch data, such as packets, from one or more sources to one or more destinations. The term "packet," as used herein, may refer to and be used interchangeably with request, message, ping, traffic, data, datagram, or cell; a fragment of a packet, a fragment of a datagram, a fragment of a cell; or another type, arrangement, or packaging of data. A router is a switching device that may receive a packet on a physical media, such as optical fiber, from another router. The router may analyze the packet, to determine its destination, and forward the packet towards its final destination. Multiple routers within one or more networks may handle a packet before the packet reaches its final destination.

A router may include a number of input and output ports from which the router transmits and receives packets. A switching fabric or other transmission medium may be implemented in the router to carry the packets between the ports. Typically, the information is transmitted within the router in discrete quantities, or "cells," which the router generates by breaking down information packets that the router receives.

One property of the switching fabric is that cells transmitted through the fabric may arrive at a destination in an out-of-order sequence due to the multiple paths that a cell may take. Thus, although a first cell of a packet of information may be transmitted before a second cell, the second cell may be received before the first cell. Further, there may be significant delay between receipt of the first and second cells. A router may reconstruct a data structure, corresponding to the packet information, from data contained in each of the first and second cells. One way to construct the data structure from data in the first and second transmitted cells may be to store the cell that is first-received (e.g., the second cell of the information packet) and to wait for receipt of the other cell (e.g., the first cell). Once both of the first two cells are received, the two cells may be ordered to construct the data structure.

A destination (e.g., a Packet Forwarding Engine (PFE) corresponding to a port of a router) may need to order a large number of cells, for multiple conversations (e.g., data streams, flows of data, etc.). Each conversation may correspond to a different PFE that is a source of cells of the conversation. Cells for each one of the conversations may need to be reordered individually. Each one of the cells of a conversation may be assigned a corresponding sequence number that may be used to reorder the cells. The destination may continue to wait for a cell with a specific sequence number (herein, missing sequence number) before finishing the reordering of the received cells. One or more of the cells may be dropped (lost) while being transmitted through the fabric and may never reach the destination. Other cells may take an unreasonably long time to arrive at the destination.

The destination may implement a unit garbage scheme that allows the destination to treat a cell (herein, missing cell) with the missing sequence number as "dropped" when the missing cell is not received after a predefined period of time (i.e., after a time out has occurred). The destination may reorder the other received cells, without one or more of the missing cell(s), after the one or more of the missing cells are dropped. The unit garbage scheme may work only for one conversation at a time and may drop only a single missing cell at a time. Under the unit garbage scheme, each conversation may have only a single missing cell dropped before the unit garbage scheme inspects all the other conversations for time out. As a result, the input of the cells may be significantly delayed.

In some situations, the destination may fall so far behind in reordering the cells for one of the conversations that the destination may need to utilize bulk garbage collection. For example, the destination may determine that the destination may no longer receive cells for a particular conversation because the destination may no longer store out-of-order cells (or will not be able to store out-of-order cells because of the number of additional cells needed to fill in the missing sequence). The bulk garbage collection may cease (stall) input (receiving) of all new cells for all the different conversations until the particular conversation is cleaned up. The bulk garbage collection may clean up the particular conversation by dropping the cells with the missing sequence numbers for the one particular conversation. The stalling of all input for all the other conversations not being cleaned up may create numerous undesirable events, such as causing problems (e.g., overflow) in the switch fabric.

SUMMARY

According to one aspect, a method may include: receiving first cells corresponding to a first conversation, where the first cells are out-of-order; reordering the first cells of the first conversation; determining whether a reorder window size is exceeded based on the reordered first cells of the first conversation; subjecting the first conversation to a fast time out when the reorder window size is exceeded; preparing a packet based on the first conversation; and transmitting the packet to a second device.

According to another aspect, a non-transitory computer-readable medium may store a program for causing a computer to perform a method. The method may include: receiving first cells corresponding to a first conversation, where the first cells are out-of-order; reordering the first cells of the first conversation; dequeueing the reordered first cells; determining whether one or more missing cells corresponding to the first conversation are dropped based on the dequeued first cells; conducting a resource check when the one or more missing cells are dropped; and subjecting a second conversation to a first fast timeout based on the resource check.

According to yet another aspect, a first packet forwarding engine (PFE) of a first device may include an input port, a storage device, and a processor. The input port may receive first cells corresponding to a first conversation and may receive second cells corresponding to a second conversation. The storage device may store one or more of the first cells and one or more of the second cells. The processor may connect to the storage device and the input port and may: reorder the first cells of the first conversation; determine whether a reorder window size is exceeded for a first time based on the first conversation; subject the first conversation to a fast time out when the reorder window size is exceeded for the first time; reorder the second cells of the second conversation while subjecting the first conversation to the fast time out; prepare a packet based on the first conversation; and transmit the packet to a second PFE of a second device.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

An implementation, described herein, may provide reordering with fast time out during transmission of a packet. Multiple conversations may be transmitted through a router. Each conversation may be broken down into multiple cells (each one of the cells may have a corresponding sequence number). Each conversation may correspond to a different PFE that is the source of the cells. The source PFEs may transmit the cells through a switch fabric. The cells may arrive out-of-order at a destination PFE because the cells may be transmitted through different paths (e.g., optical connections) of the switch fabric. A reorder engine of the destination PFE may reorder the cells of each conversation as the cells arrive out of the switch fabric.

The reorder engine may inspect each one of the conversations being reordered to determine whether condition(s) to subject one or more of the conversations to a fast time out process (herein, fast time out) are met. The conditions may be met when a reorder window size is exceeded (as further explained below) for a conversation and/or resource limitations are exceeded. Fast time out may allow the reorder engine to drop multiple missing cells, of a conversation, that have failed to arrive out of the switch fabric. The reorder engine may dwell (continue to operate) on the conversation, by subjecting the conversation to the fast time out, until a sufficient number of missing cells of the conversation are dropped (e.g., when the reorder window size is no longer exceeded for the conversation). The reorder engine may continue to reorder the conversation without the dropped cells after the fast time out of the conversation is complete. The reorder engine may process other conversations (e.g., receive and/or order cells of the other conversations, subject one or more of the other conversations to fast time out, etc.) while dwelling (continuing to operate) on a conversation during the fast time out.

Figure 1:
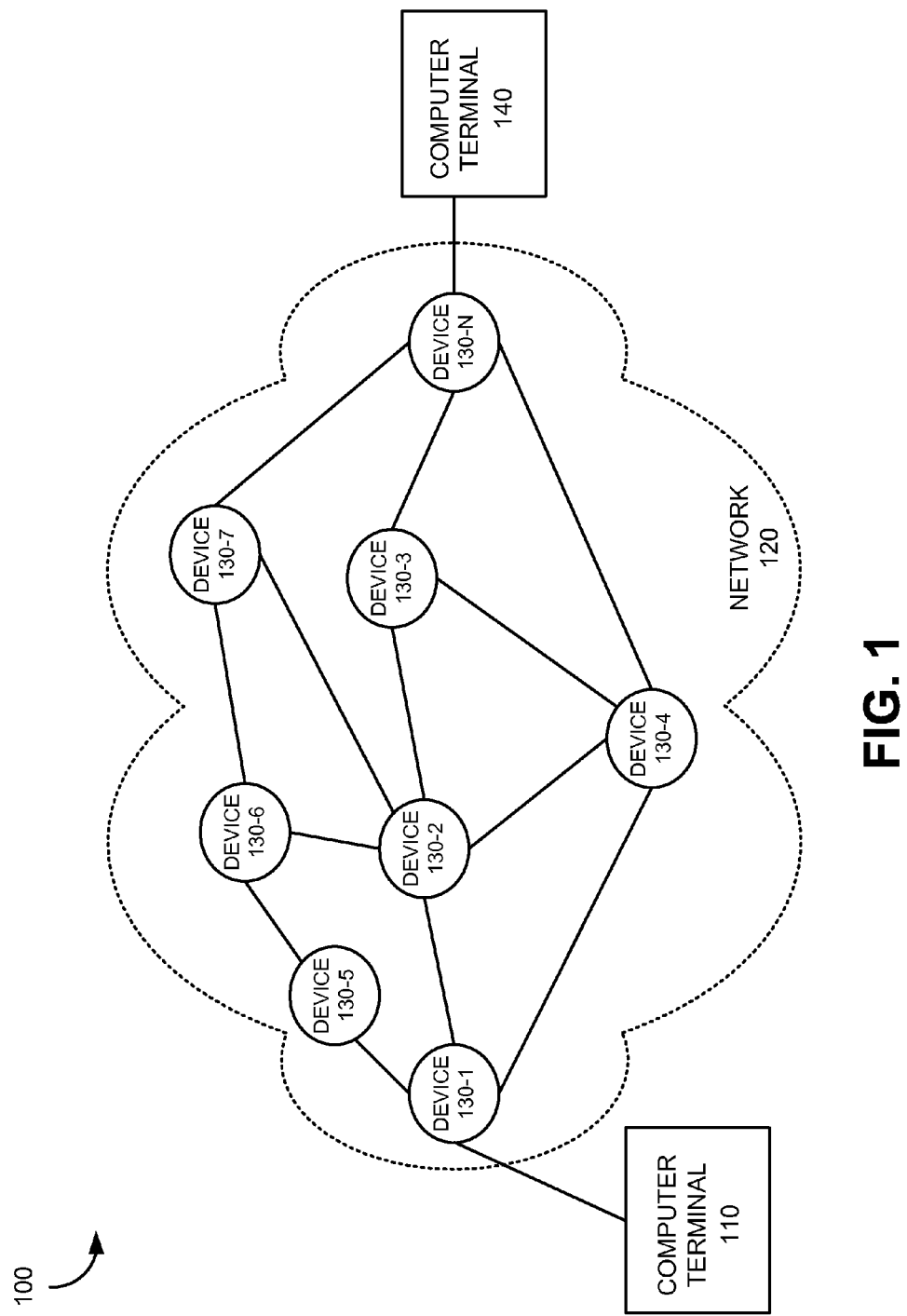
FIG. 1 is a diagram of an example environment in which systems and/or methods described herein may be implemented.

FIG. 1 is a diagram of an example environment 100 in which systems and/or methods described herein may be implemented. Environment 100 may include one or more of the following elements: a computer terminal 110, a network 120, and a computer terminal 140.

Computer terminal 110 may represent any device capable of transmitting and/or receiving data to/from network 120. Computer terminal 140 may represent any device capable of transmitting/receiving data to/from network 120. In one implementation, each one of computer terminal 110 and computer terminal 140 may take the form of a computer, a switch, a smart phone, a personal computer, a laptop, a handheld computer, a portable communication device (e.g., a mobile phone), an access point base station, etc. Computer terminal 110 and computer terminal 140 may be directly connected to network 120 or indirectly connected through a router, a switch, a bridge, a firewall, a gateway, etc. Computer terminal 110 and computer terminal 140 may also be part of network 120 and may operate as devices 130.

Network 120 may represent a single network, multiple networks of a same type, or multiple networks of different types. For example, network 120 may include a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

Network 120 may include network devices 130-1, 130-2, . . . , 130-N (collectively referred to as "devices 130" and individually as "device 130"). Devices 130 may connect via a number of network links. The network links may include wired and/or wireless links. Each device 130 may connect to one or more other devices 130. While FIG. 1 shows a particular number and arrangement of devices 130, network 120 may include additional, fewer, different, or differently arranged devices 130 than are illustrated in FIG. 1.

Device 130 may include a network device that transmits data traffic. For example, device 130 may take the form of a routing device, a switching device, a multiplexing device, or a device that performs a combination of routing, switching, and/or multiplexing functions. In one implementation, device 130 may be a digital device. In another implementation, device 130 may be an optical device. In yet another implementation, device 130 may be a combination of a digital device and an optical device.

Device 130 may include a component to receive, transmit, and/or process traffic on a network link. For example, device 130 may include an Ethernet interface, an optical carrier (OC) interface, an asynchronous transfer mode (ATM) interface, or another type of interface. Device 130 may manage a set of one or more input ports via which packets can be received, a set of one or more output ports via which packets can be transmitted, and/or a set of one or more input/output ports via which packets can be received and transmitted.

Device 130 may perform certain operations, as described in detail below. Device 130 may perform these operations in response to a processor of device 130 executing software instructions (e.g., computer program(s)) contained in a computer-readable medium, such as a secondary storage device (e.g., hard disk, CD-ROM, etc.) or other forms of RAM or ROM. A computer-readable medium may be defined as a non-transitory memory device. A memory device may include memory space within a single physical memory device or spread across multiple physical memory devices.

Device 130 may perform certain operations on incoming and/or outgoing packets, such as decapsulation, encapsulation, demultiplexing, multiplexing, queuing, etc. operations, that may facilitate the processing and/or transportation of incoming and/or outgoing packets. In one implementation, device 130 may function as a node on a network link in network 120 (e.g., an ingress node, an intermediate node and/or an output node), may receive packets, may perform operations on packets (e.g., append, remove, reroute, and/or other operations), and may transmit packets to other devices 130.

Device 130 may perform other operations on incoming and/or outgoing packets. For example, device 130 may perform data integrity operations on incoming and/or outgoing packets. In another example, device 130 may perform incoming packet buffering operations that may include performing packet segmentation operations (e.g., breaking the packet into cells (e.g., segments)), generating packet control information to manage packet data during packet buffering operations, and/or storing packet data and packet control information, etc. In yet another example, device 130 may perform outgoing packet buffering operations that may include retrieving packet control information and/or performing data integrity operations. Additionally, or alternatively, device 130 may, from the packet control information, retrieve packet cells, reassemble the packet cells into outgoing packets, and transmit outgoing packets in accordance with packet forwarding information.

Computer terminal 110 may allow a user to instruct computer terminal 110 to transmit data to computer terminal 140. The data may be transmitted through network 120 by devices 130. Device 130 may break down the data into separate cells that are transmitted separately. Device 130 may reorder the cells back into the order of the original data before forwarding the data to another one of devices 130.

Figure 2:
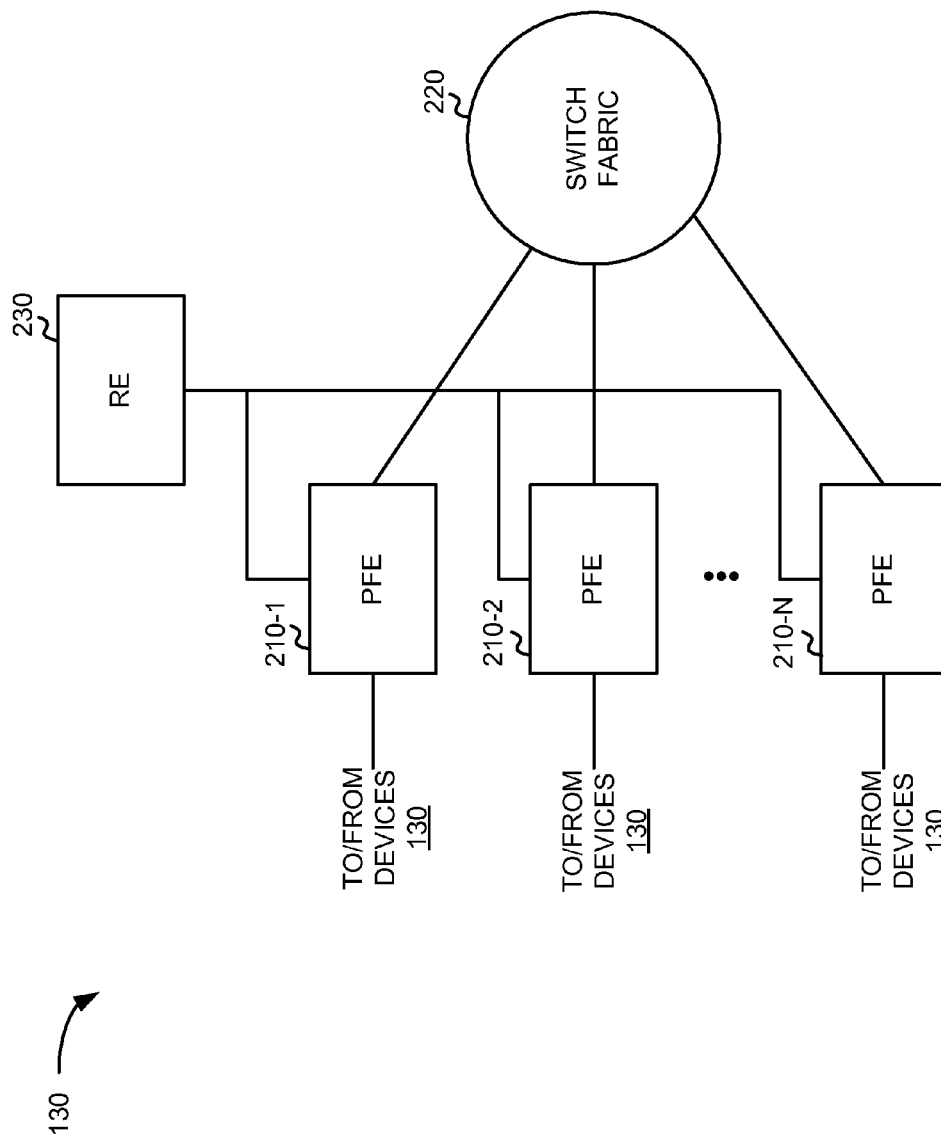
FIG. 2 is a diagram of example components of one or more of the devices of FIG. 1.

FIG. 2 is a diagram of example components of one or more of devices 130 of FIG. 1. As shown in FIG. 2, device 130 may include packet forwarding engines (PFEs) 210-1, 210-2, . . . , 210-N (collectively referred to as "PFEs 210" and individually as "PFE 210"), a switch fabric 220, and a routing engine (RE) 230. In another implementation, device 130 may include additional components, fewer components, different components, or differently arranged components than are shown in FIG. 2. For example, device 130 may include other input/output units instead of/besides PFEs 210.

PFEs 210 may each be connected to RE 230 and switch fabric 220. Each one of PFEs 210 may correspond to an input/output port of device 130. PFE 210 may include a component or collection of components to receive packets, to process incoming and/or outgoing packets, and/or to transmit outgoing packets. For example, PFE 210 may include I/O ports, an Ethernet interface and/or another type of interface, a central processing unit (CPU), and/or a memory device. PFE 210 may include a collection of ports that connect, via physical links, to devices 130 in network 120. PFE 210 may include packet processing component(s), switch interface component(s), Internet processor component(s), memory device(s), etc. Each one of PFEs 210 may also represent a separate router.

PFE 210 may perform certain operations on incoming and/or outgoing packets, such as decapsulation, encapsulation, demultiplexing, multiplexing, queuing, dequeuing, etc. operations, which may facilitate the processing and/or transportation of incoming and/or outgoing packets. PFE 210 may receive incoming packets and may forward the incoming packets to other PFEs 210 via switch fabric 220. For example, PFE 210 may receive incoming packets and may determine to which other PFEs 210 the incoming packets may be sent based on a forwarding table (e.g., received from RE 230).

PFE 210 may perform incoming packet buffering operations. For example, PFE 210 may receive packets and may remove header information from the packet. PFE 210 may perform a segmentation operation on the packet data (e.g., on the data payload portion of the packet) by breaking the packet data into fixed-length fragments (herein, referred to collectively as "cells" and individually as a "cell"). PFE 210 may generate control blocks to store packet control information associated with the cells. PFE 210 may store the cells in a data memory and may store the control blocks in a control memory.

PFE 210 may perform outgoing packet buffering operations. For example, PFE 210 may retrieve control blocks from control memory and may remove control protection information from the control blocks (e.g., checksum information and/or other forms of control protection information). From the control protection information, PFE 210 may perform a data integrity operation to determine whether the packet control information, obtained from the control blocks, contains an error. PFE 210 may, based on the packet control information, retrieve cells from data memory and may reorder/reassemble the cells into outgoing packets for transmission to the next PFE 210 and/or other network device.

Switch fabric 220 may include one or more switching planes to facilitate communication among PFEs 210 and/or RE 230. In one implementation, each of the switching planes may include a single or multi-stage switch of crossbar elements. In another implementation, each of the switching planes may include some other form of switching elements. Switch fabric 220 may also, or alternatively, include processors, memories, and/or paths that permit communication among PFEs 210 and/or RE 230.

Switch fabric 220 may receive information from one of PFEs 210 and may send the information to one or more other PFEs 210. For example, switch fabric 220 may receive control blocks (e.g., requests) and/or data cells from PFE 210-1 via which an incoming packet was received and may forward the control blocks and/or data cells to PFE 210-2 via which an outgoing packet may be transmitted.

RE 230 may include a processor, a microprocessor, or some form of hardware logic (e.g., an application specific integrated circuit (ASIC) or a field programmable gate array (FPGA)). In one implementation, for example, RE 230 may include an Ethernet controller and/or another controller device. RE 230 may perform high-level management functions for device 130. For example, RE 230 may communicate with other networks and/or systems connected to device 130 to exchange information regarding network topology. RE 230 may create a routing table based on the network topology information, create forwarding table(s) based on the routing table, and may forward the forwarding table(s) to PFEs 210. RE 230 may also perform other general control and monitoring functions for device 130.

For example, a user at computer terminal 110 may instruct computer terminal 110 to transmit a packet to computer terminal 140. Computer terminal 110 may transmit the packet to network 120 via device 130-1. Device 130-1 may forward the packet to device 130-2. PFE 210-1 of device 130-2 may receive the packet from PFE 210 of device 130-1. PFE 210-1 of device 130-2 may break down the packet into cells and forward the cells through switch fabric 220 to PFE 210-2 of device 130-2. PFE 210-2 may receive the cells out-of-order. PFE 210-2 may reorder the out-of-order cells, of a conversation corresponding to the original packet sent by computer terminal 110, during receipt of the cells. PFE 210-2 may forward the conversation to device 130-3. The conversation may be forwarded by devices 130 in this manner until the packet, in the form of the conversation, reaches computer terminal 140.

Figure 3:
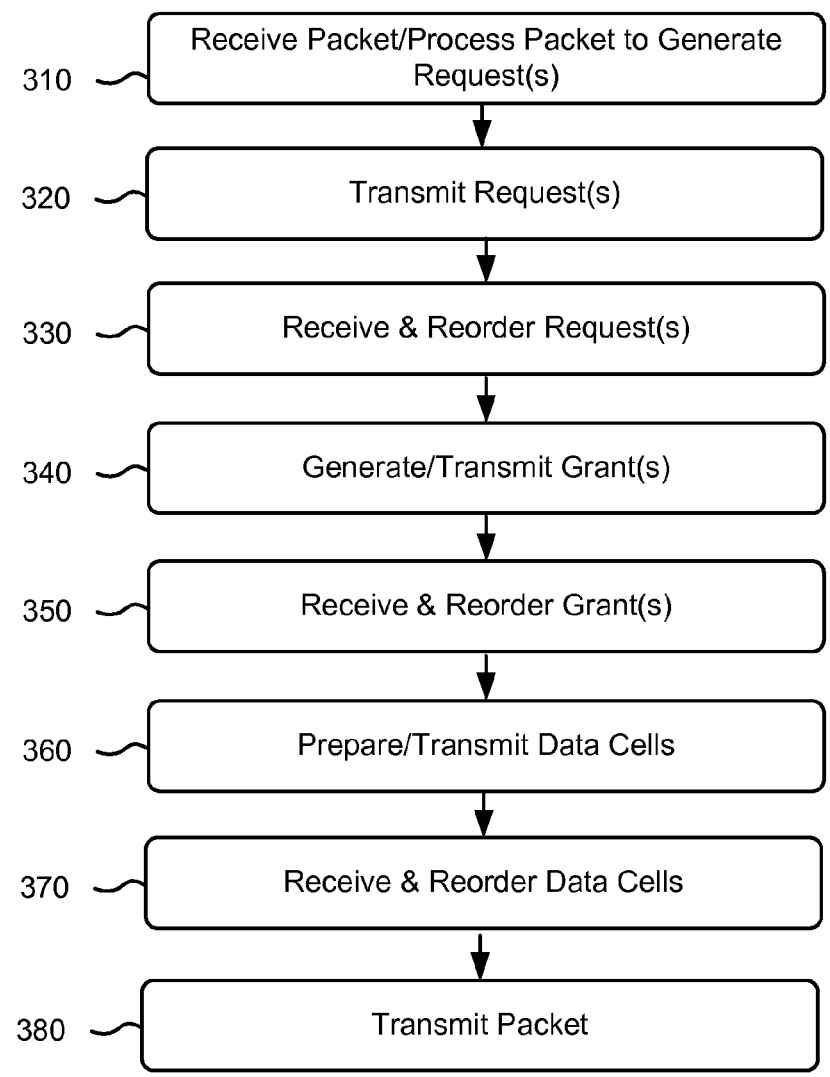
FIG. 3 is a flowchart of an example process for providing reordering during transmission of a packet.
Figure 4:
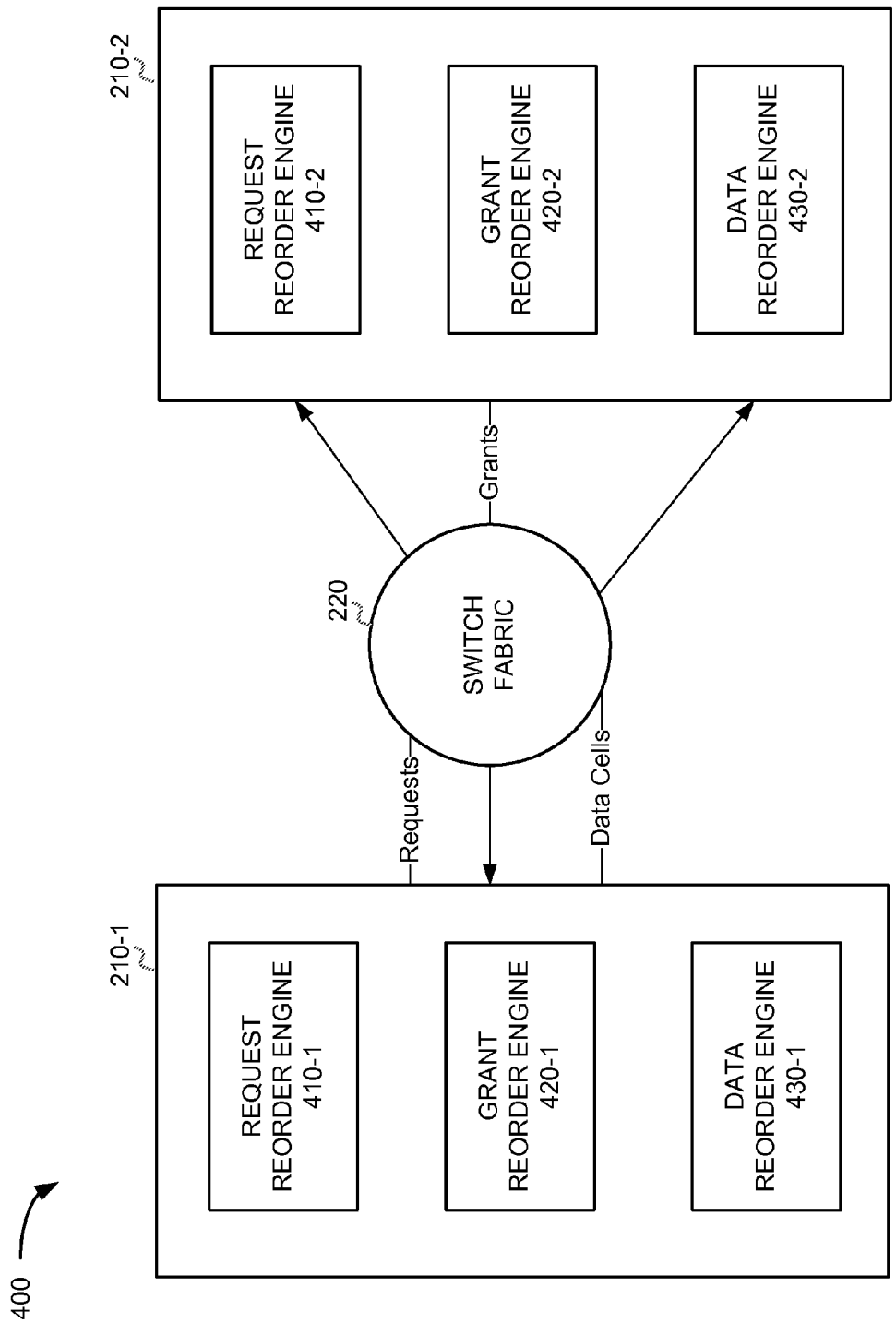
FIG. 4 is a diagram conceptually illustrating example components and an example operation of Packet Forwarding Engines (PFEs) of FIG. 2.

FIG. 3 is a flowchart of an example process 300 for providing reordering during transmission of a packet between PFEs 210. Process 300 will be described with reference to FIG. 4. FIG. 4 is a diagram 400 conceptually illustrating example components and operations of PFE 210-1 and PFE 210-2.

As illustrated in FIG. 4, PFE 210-1 may include a request reorder engine 410-1, a grant reorder engine 420-1, and a data reorder engine 430-1. PFE 210-2 may include a request reorder engine 410-2, a grant reorder engine 420-2, and a data reorder engine 430-2. Request reorder engines 410-1 and 410-2 may reorder requests received from other PFEs 210 (e.g., request reorder engine 410-2 may reorder requests received from PFE 210-1). Grant reorder engines 420-1 and 420-2 may reorder grants received from other PFEs 210 (e.g., grant reorder engine 420-1 may reorder grants received from PFE 210-2). And, data reorder engines 430-1 and 430-2 may reorder data cells received from other PFEs 210 (e.g., data reorder engine 430-2 may reorder data cells received from PFE 210-1). Process 300 may be implemented by request reorder engine 410-2, grant reorder engine 420-1, and data reorder engine 430-2.

As shown in FIG. 3, process 300 may include receiving a packet and processing the packet to generate requests (block 310). For example, PFE 210-1 of device 130 may receive a packet from another one of devices 130. PFE 210-1 may determine a destination of the packet (and how the packet should be forwarded) based on header information of the packet. PFE 210-1 may break down the packet into data cells. PFE 210-1 may generate one or more requests to forward/send the data cells based on the destination. Each one of the requests may correspond to one or more of the data cells or to the packet. A sequence number may correspond to each one of the requests.

The request(s) may be transmitted (block 320). For example, PFE 210-2 may be determined as the next immediate destination of the data cells. As a result, PFE 210-1 may transmit the requests through switch fabric 220 to PFE 210-2. The individual requests may take different paths through switch fabric 220 and may arrive at PFE 210-2 after different amounts of time. As a result, for example, a first request that was sent earlier than a second request may arrive after the second request. Some of the requests may be lost during the transmission through switch fabric 220.

The requests may be received and reordered (block 330). For example, PFE 210-2 may receive the requests one at a time and out-of-order. PFE 210-2 may temporarily store the out-of-order requests in a buffer. Request reorder engine 410-2 may place the requests in the proper order as the requests are received from switch fabric 220. While reordering the requests received from PFE 210-1, request reorder engine 410-2 may reorder requests for other request conversations, being received by PFE 210-2, from other PFEs 210.

During the receiving (and/or, specifically, during an enqueueing of the cells by request reorder engine 410-2) (herein, receiving by PFE 210 may refer to enqueueing by any reorder engine of PFE 210), request reorder engine 410-2 may determine whether request reorder engine 410-2 has sufficient resources to continue to operate properly based on a predefined number of factors (e.g., whether request reorder engine 410-2 has sufficient memory to store additional out-of-order requests, whether the enqueueing of the requests is faster than the dequeueing of the requests, etc.). If request reorder engine 410-2 determines that there might not be a sufficient resources (e.g., predefined resource limitations are exceeded), request reorder engine 410-2 may identify request conversations that should be subjected to fast time out and subject those conversations to fast time out. Request reorder engine 410-2 may subject multiple request conversations to fast time outs at the same time. A request conversation may be subjected to a fast time out, when resource limitations are exceeded, if PFE 210-2 continues to receive new requests for the request conversation (e.g., continuing to receive requests from PFE 210-1) and/or the request conversation is being timed out. A request conversation may be timed out when PFE 210-2 does not receive a request corresponding to a specific sequence number after a predefined period of time and/or is subjected to a fast time out.

During the reordering, a time out thread may be executed to identify, one at a time (and/or sequentially), individual request conversations that should be subjected to a fast time-out. The time out thread may identify and subject a conversation to a fast time out when a predefined reorder window size is exceeded for the conversation, as described below with reference to FIG. 6. Fast time out may dwell on a conversation until the reorder window size is no longer exceeded for the conversation. Fast time out may cease for the conversation when the reorder window size is no longer exceeded. The time out thread may subject multiple conversations to fast time outs at the same time. Request reorder engine 410-2 may continue to enqueue and reorder requests for other conversations from other PFEs 210, which are not being subjected to fast time out.

After finishing the receiving and reordering of requests (e.g., of a conversation corresponding to a packet) from PFE 210-1, request reorder engine 410-2 may dequeue the requests to be further processed by PFE 210-2. During the dequeueing, request reorder engine 410-2 may determine whether any cells were dropped for the conversation. If any cells were dropped, request reorder engine 410-2 may perform a resource check similar to the one performed during the enqueueing of requests, described above.

Returning to FIG. 3, grants may be generated in response to the requests, and the grants may be transmitted (block 340). For example, after request reorder engine 410-2 finishes dequeueing the requests to PFE 210-2, PFE 210-2 may determine whether PFE 210-2 has capacity to receive data cells, specified in/corresponding to the requests, from PFE 210-1. When PFE 210-2 determines that PFE 210-2 has capacity to receive the data cells, PFE 210-2 may generate grant(s) in response to the requests. Each one of the grants may correspond to each one of the requests. A different sequence number may correspond to each one of the grants. PFE 210-2 may transmit the grants through switch fabric 220 to PFE 210-1, the source of the requests. The individual grants may take different paths through switch fabric 220 and may arrive at PFE 210-1 after different amounts of time. Some of the grants may be lost during the transmission through switch fabric 220.

The grants may be received and reordered (block 350). For example, PFE 210-1 may receive/enqueue the grants from PFE 210-2 one at a time and out-of-order. PFE 210-1 may temporarily store the out-of-order grants in a buffer. Grant reorder engine 420-1 may place the grants in the proper order as the grants are received from PFE 210-2. While reordering the grants received from PFE 210-2, grant reorder engine 420-1 may also reorder grants for other grant conversations, being received by PFE 210-1, from other PFEs 210. After completing the reordering of the grants, of a grant conversation from PFE 210-2, grant reorder engine 420-1 may dequeue the grants to be further processed by PFE 210-1. During the receiving/enqueueing, reordering, and/or dequeueing of the grants, grant reorder engine 420-1 may subject grant conversations to fast time outs. Grant reorder engine 420-1 may conduct fast time outs of grant conversations in a similar way that request reorder engine 410-2 conducts fast time outs of request conversations, as described above.

Data cells, corresponding to the grants, may be prepared, and the data cells may be transmitted (block 360). For example, after grant reorder engine 420-1 finishes dequeueing grants corresponding to a grant conversation, PFE 210-1 may prepare data cells corresponding to the grants and to the packet original received by PFE 210-1. Each one of the grants may correspond to one or more of the data cells. A different sequence number may correspond to each one of the data cells. PFE 210-1 may transmit the data cells through switch fabric 220 to PFE 210-2. The individual data cells may take different paths through switch fabric 220 and may arrive at PFE 210-2 after different amounts of time. Some of the data cells may be lost during the transmission through switch fabric 220.

The data cells may be received and reordered (block 370). For example, PFE 210-2 may receive the data cells, from switch fabric 220, one at a time and out-of-order. PFE 210-2 may temporarily store the out-of-order data cells in a buffer. Data reorder engine 430-2 may place the data cells in the proper order as the data cells are received from switch fabric 220. While reordering the data cells received from PFE 210-1, data reorder engine 430-2 may reorder data cells for other conversations, being received by PFE 210-2, from other PFEs 210. After completing the reordering of the data cells, of a data conversation from PFE 210-1, data reorder engine 430-2 may dequeue the grants to be further processed by PFE 210-2. During the receiving, reordering, and dequeueing of the grants, data reorder engine 430-2 may subject data conversations to fast time outs. Data reorder engine 430-2 may conduct fast time outs of data conversations in a similar way that request reorder engine 410-2 conducts fast time outs of request conversations and grant reorder engine 420-1 conducts fast time outs of grant conversations, as described above.

As further shown in FIG. 3, the packet may be transmitted (block 380). For example, after the dequeueing of the data cells for a conversation, the packet that was originally received by PFE 210-1 may be reassembled and be ready to be transmitted by PFE 210-2. PFE 210-2 (e.g., of device 130-1 in FIG. 1) may forward/transmit the reassembled packet to another device (e.g., device 130-2 in FIG. 1) towards the final destination (e.g., computer terminal 140) of the packet.

Figure 5:
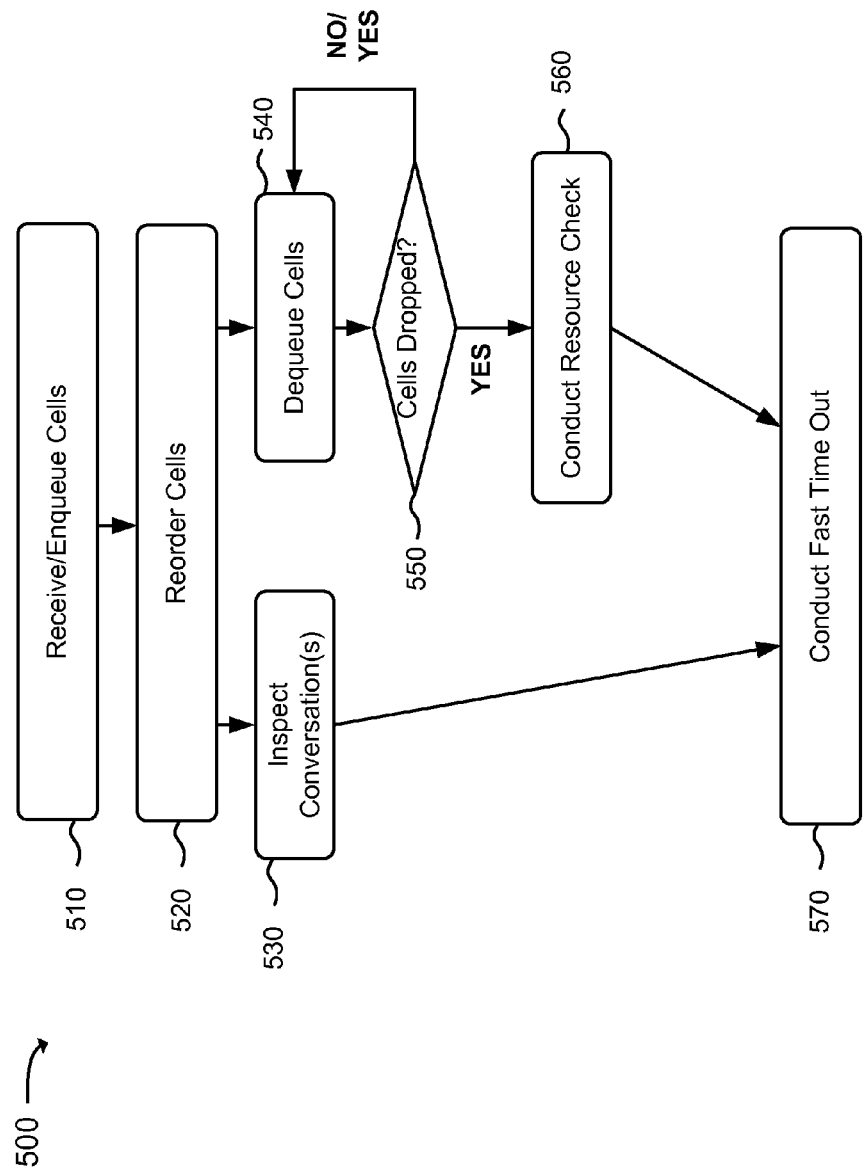
FIG. 5 is a flowchart of an example process for providing reordering with fast time out, during packet transmission, according to implementations described herein.

FIG. 5 is a flowchart of an example process 500 for providing reordering with fast time out according to implementations described herein. Process 500 may be performed independently by request reorder engine 410-1, request reorder engine 410-2, grant reorder engine 420-1, grant reorder engine 420-2, data reorder engine 430-1, and/or data reorder engine 430-2. The term "reorder engine," as used below, may refer to any one of the aforementioned reorder engines. In one example, each one of blocks 330, 350, and 370 of FIG. 3 may independently correspond to process 500. Process 500 will be described below with reference to "cells." "Cells," as used herein, may refer to requests, grants, or data cells.

Process 500 may include receiving/enqueueing cells (block 510). For example, PFE 210-2 may receive cells from one or more other PFEs 210 (e.g., PFE 210-1 and PFE 210-3) through switch fabric 220. Cells being sent by different PFEs 210 may correspond to different conversations. For example, cells from PFE 210-1 may correspond to a first conversation, and cells from PFE 210-3 may correspond to a second conversation. Each one of the cells within a conversation may have a corresponding sequence number. PFE 210-2 may receive cells for each conversation out-of-order. In one example, PFE 210-2 may receive the first four cells of the first conversation in the following order: cell 2, cell 1, cell 3, and cell 10. In another example, PFE 210-2 may receive the first four cells of the second conversation in the following order: cell 2, cell 3, cell 1, and cell 7. PFE 210-2 may continue to receive cells for the different conversations throughout process 500. A reorder engine of PFE 210-2 may enqueue the received cells for each conversation into the reorder engine. The reorder engine may execute an enqueue thread to handle the enqueueing of cells and/or conducting a resource check. As discussed above, receiving by PFE 210 and enqueueing by any reorder engine of PFE 210 may be used interchangeably.

The cells may be reordered (block 520). While PFE 210-2 receives cells being transmitted through switch fabric 220, the reorder engine of PFE 210-2 (e.g., data reorder engine 430-2) may reorder cells of each conversation to place the cells in the proper order based on the sequence numbers assigned to the cells. The reorder engine may reorder multiple conversations at one time. In the example presented above, PFE 210-2 may first receive cell 2 of the first conversation. PFE 210-2 may wait to receive cell 1 and may place cell 2 in a buffer before the reorder engine places cell 1 and cell 2 in the proper order. PFE 210-2 may then receive cell 1 of the first conversation. As a result, the reorder engine may place cell 1 and cell 2 of the first conversation in the proper order: cell 1, cell 2. PFE 210-2 may then receive cell 3 of the first conversation. The reorder engine may place cell 3 next in order because its sequence number (3) follows a reorder pointer (2) of the first conversation. A value of the reorder pointer equals a sequence number of the last cell that has been ordered or of the last cell that has been dropped, as further described below. PFE 210-2 may then receive cell 10 of the first conversation. The reorder engine may continue to wait for cells 4-9 before placing cell 10 as the next cell, in sequence, of the first conversation. As further explained below, the reorder engine may place cell 10 in order after cell 3 of the first conversation if cells 4-9 of the first conversation are dropped by the reorder engine before being received.

While the reorder engine reorders cells of the first conversation, the reorder engine may also reorder cells of the second conversation. PFE 210-2 may first receive cell 2 and cell 3 of the second conversation. Cell 2 and cell 3 may be stored until PFE 210-2 receives cell 1 of the second conversation. When PFE 210-2 receives cell 1, the reorder engine may place cell 1, cell 2, and cell 3 of the second conversation in the proper order. PFE 210-2 may then receive cell 7, and continue to wait for cells 4-6 before placing cell 7 in a proper order for the second conversation. As further explained below, the reorder engine may place cell 7 in order after cell 3 of the second conversation if cells 4-6 of the second conversation are dropped by the reorder engine before being received.

Returning to FIG. 5, the conversations may be inspected (block 530). For example, during process 500, a separate time out (TO) thread may be executed by the reorder engine to inspect each one of the conversations being received and/or reordered. The TO thread may inspect each one of the conversations one at a time in a round robin scheme. The TO thread may first determine whether a conversation should be subject to a normal time out. A normal time out may occur when a cell with a sequence number that follows the reorder pointer for a conversation has not been received after a predefined period of time (e.g., 1 second).

In the example of the first conversation presented above, PFE 210-2 may receive and order cell 1, cell 2, and cell 3, and receive and store cell 10. The reorder pointer, at that point, may point to cell 3 of the first conversation (i.e., equal to the sequence number (3) of cell 3). The reorder engine may continue to wait for cell 4 because cell 4's sequence number (4) follows the number of the reorder pointer (3). The TO thread may determine that the reorder engine has been waiting for cell 4 of the first conversation for longer than the predefined period of time (e.g., 1 second). As a result, the TO thread may drop cell 4 of the first conversation and move the reorder pointer to equal to 4. The reorder engine may now wait for cell 5 of the first conversation because cell 5's sequence number (5) follows the current position of the reorder pointer (4). The TO thread may also determine whether the conversation should be subject to a fast time out, as further described below in reference to FIG. 6. The TO thread may continue to inspect conversations (e.g., the second conversation) and subject the conversations to normal time outs and fast time outs while the reorder engine is already subjecting one or more other conversations (e.g., the first conversation) to fast time out.

As further shown in FIG. 5, the cells may be dequeued (block 540). For example, the reorder engine may have a separate thread to dequeue cells from the reorder engine after the cells are reordered by the reorder engine. In other words, after the reorder engine finishes reordering cells of a conversation (e.g., the first conversation), the reorder engine may dequeue the cells out of the reorder engine for further processing by PFE 210. For example, the reorder engine may reorder cells of the first conversation in the following order, after dropping cells 4-9: cell 1, cell 2, cell 3, and cell 10. The dequeue thread may dequeue cell 1, cell 2, cell 3, and cell 10.

During the dequeueing, the dequeue thread of the reorder engine may determine whether cells were dropped in the conversation corresponding to the dequeued cells (block 550). For example, during the dequeueing of cells of the first conversation, the dequeue thread may determine whether any cells were dropped to complete reordering cell 1, cell 2, cell 3, and cell 10. In the example, there is a gap between cell 3 and cell 10 since cells corresponding to sequence numbers 4-9 of the first conversation were not dequeued. As a result, the dequeue thread may determine that cells (cells 4-9) of the first conversation were dropped.

If cells were dropped (block 550—YES), then the reorder engine may conduct a resource check (block 560). As described below in reference to FIG. 7, the dequeue thread may conduct a resource check when cells were dropped and the reorder engine determines that there is an insufficient amount of resources. The resource check may determine whether any current conversations should be subject to fast time out to gain additional resources to continue receiving/enqueueing, reordering, and dequeueing cells of different conversations properly.

Regardless of whether the cells were or were not dropped (block 550—NO/YES), the reorder engine may continue to dequeue cells (block 540). In other words, regardless of whether the dequeue thread determines that cells were dropped and a resource check needs to be conducted, the dequeue thread may continue to dequeue cells of different conversations.

A fast time out may be conducted (block 570). A conversation may be subjected to a fast time out when: (1) a reorder window size is exceeded for a conversation (see description of FIG. 6 below); and/or (2) additional resources are needed for a reorder engine to continue to operate properly (see description of FIG. 7 below). In one implementation, a TO thread may subject a conversation to a fast time out when the reorder window size is exceeded for the conversation. An enqueue thread and/or a dequeue thread may subject conversations to fast time outs when additional resources are needed. In another implementation, the TO thread may also check whether other conversations need to be subjected to a fast time out when additional resources are needed. A conversation subjected to a fast time out may stay in the fast time out until the reorder window size is no longer exceeded. The reorder engine may subject multiple conversations to fast time outs at the same time. The reorder engine may continue to receive/enqueue (block 510), reorder (block 520), and dequeue cells (block 540) for conversations that are not being subjected to fast time outs when other conversation(s) are being subjected to fast time out(s). When a fast time out for a conversation is complete, the reorder engine may again receive/enqueue, reorder, and dequeue cells for the conversation. The enqueue thread, the TO thread, and the dequeue thread may continuously subject (and recommit) conversations to fast time outs when proper conditions are met.

Figure 6:
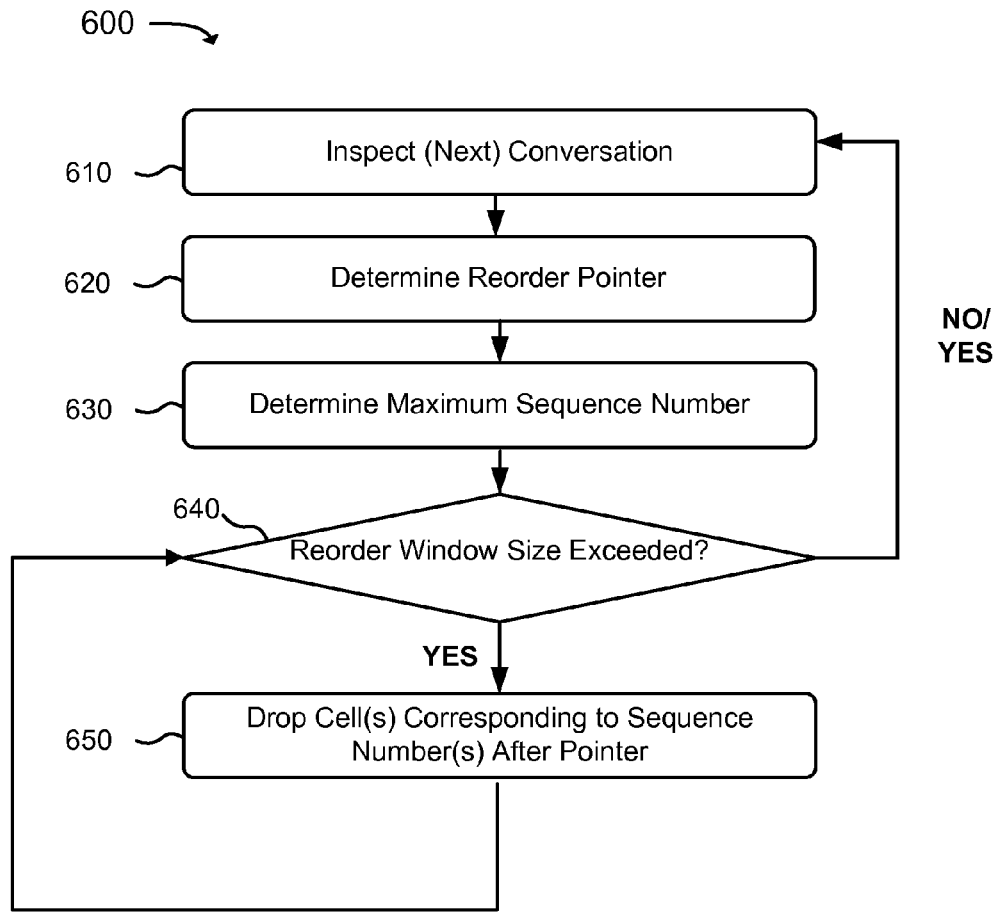
FIG. 6 is a flowchart of an example process for providing fast time out, during packet transmission, according to implementations described herein.

FIG. 6 is a flowchart of an example process 600 for providing a fast time out according to implementations described herein. Process 600 may be performed independently by request reorder engine 410-1, request reorder engine 410-2, grant reorder engine 420-1, grant reorder engine 420-2, data reorder engine 430-1, and/or data reorder engine 430-2. In one example, process 600 of FIG. 6 may correspond to blocks 530 and 570 of FIG. 5.

Process 600 may include inspecting a (next) conversation (block 610). For example, a TO thread may inspect each one of the conversations being received by a reorder engine. After inspecting one conversation (e.g., the first conversation), the TO thread may determine which is the next conversation (e.g., the second conversation) that needs to be inspected. As described above, the TO thread may first determine whether a conversation should be subject to a normal time out. Thereafter, or at the same time, the TO thread may determine whether the conversation needs to be subjected to a fast time out.

A reorder pointer may be determined (block 620). For example, to determine whether a conversation needs to be subjected to a fast time out, a reorder engine may first determine the reorder pointer corresponding to the conversation. In the example discussed above, a reorder engine may receive cell 1, cell 2, cell 3, and cell 10 of the first conversation. The reorder engine may reorder cell 1, cell 2, and cell 3 in the proper order and wait for cell 4 which follows cell 3. The reorder pointer may correspond to a sequence number of the last cell of the conversation ordered or a sequence number corresponding to the last missing cell of the conversation that was dropped. In the example, the reorder engine may determine that a value of the reorder pointer corresponding to the first conversation is 3 because the last cell ordered is cell 3. In another implementation, if the first conversation was already subjected to a normal time out one time, the reorder engine may determine that a value of the reorder pointer corresponding to the first conversation is 4 because the last missing cell of the conversation dropped due to the normal time out corresponds to cell 4.

A maximum sequence number may be determined (block 630). For example, to determine whether a conversation needs to be subjected to a fast time out, the reorder engine may also need to determine the maximum sequence number of a cell received by PFE 210 for a conversation. In the example discussed above, a cell with the maximum sequence number received of the first conversation is cell 10. As a result, the reorder engine may determine that the maximum sequence number of the first conversation is 10.

Thereafter, the reorder engine may determine whether a reorder window size is exceeded (block 640). To determine whether a reorder window size is exceeded, a reorder engine may first determine a value that is set for the reorder window size. In one implementation, a reorder window size may be predefined for when a fast time out should be triggered by a TO thread. In other implementations, different reorder window sizes may be set for different reorder engines and/or for different types of cells. In yet another implementation, a reorder window size may change based on one or more factors (e.g., amount of resources being used by a reorder engine). The reorder engine may determine a difference between the maximum sequence number and a value of the reorder pointer to determine whether the reorder window size is exceeded based on the difference. If the difference is greater than the reorder window size, then the reorder window size is exceeded. If the difference is less than or equal to the reorder window size, then the reorder window size is not exceeded.

For example, a reorder window size may be set to 4. In the example above, a reorder pointer equals 3, corresponding to the last ordered cell (cell 3), of the first conversation. The maximum sequence number is 10, corresponding to cell 10, which has the highest sequence number of all the cells yet received of the first conversation. A reorder engine may determine the difference between the maximum sequence number and the reorder pointer by subtracting 3 from 10. In the example, the difference is 7. Since 7 is greater than 4, the reorder window size is exceeded.

Returning to FIG. 6, if the reorder window size is exceeded (block 640—YES), then the reorder engine may drop a cell corresponding to a sequence number that is one increment higher than a reorder pointer (block 650). After determining that the reorder window size is exceeded for a conversation (e.g., the first conversation), the reorder engine may drop a missing cell (e.g., cell 4) with a sequence number following the reorder pointer (3). The reorder pointer may be increased to equal the sequence number (4) of the newly dropped missing cell (cell 4). Thereafter, the reorder engine may again determine whether reorder window size is exceeded (block 640). In the example discussed above, the reorder engine may drop cell 4, cell 5, and cell 6 of the first conversation. After dropping cell 6, the reorder pointer may equal a sequence number (6) of cell 6. At that point the difference between the maximum sequence number of 10 and the reorder pointer of 6 may equal 4. The difference of 4 does not exceed the reorder window size of 4. As a result, fast time out of the first conversation may cease. The reorder engine may now wait to receive and to order cell 7 of the first conversation.

In another implementation, if the reorder window size is exceeded (block 640—YES), then the reorder engine, during fast time out, may drop two or more missing cells, corresponding to sequence numbers following a reorder pointer, of a conversation at a time (block 650). The number of multiple cells dropped at one time may be predefined and/or may vary based on a variety of factors (e.g., size of the difference). For example, two missing cells may be dropped whenever a determination is made that the reorder window size is exceeded. In the example discussed above, the reorder engine may drop cell 4 and cell 5 at one time after determining that the reorder window size (4) is exceeded by the difference (7) between the reorder pointer (3) and the maximum sequence number (10) (i.e., 10−3=7 and 7>4). After missing cell 4 and missing cell 5 are dropped, the reorder pointer may be set to 5, which is equal to a sequence number of the last dropped cell (cell 5). The reorder engine may then determine that the current difference (10−5=5) still exceeds the reorder window size (4). As a result, the reorder engine may drop two more missing cells at one time, cell 6 and cell 7, whose corresponding sequence numbers follow reorder pointer 5. Thereafter, the reorder pointer may be set to 7, which is equal to sequence number of the last dropped missing cell (cell 7). The reorder engine may then determine that the current difference (10−7=3) no longer exceeds the reorder window size (4). As a result, fast time out of the first conversation may cease. The reorder engine may now wait to receive and to order cell 8 of the first conversation.

Regardless of whether the reorder window size is exceeded (block 640—NO/YES), the reorder engine may continue to inspect a next conversation (e.g., the second conversation) (block 610) after determining whether the reorder window size is exceeded for a current conversation (e.g., the first conversation). As a result, the reorder engine may repeat process 600 for the next conversation, and multiple conversations (e.g., the first conversation and the second conversation) may be subjected to fast time out at one time.

Figure 7:
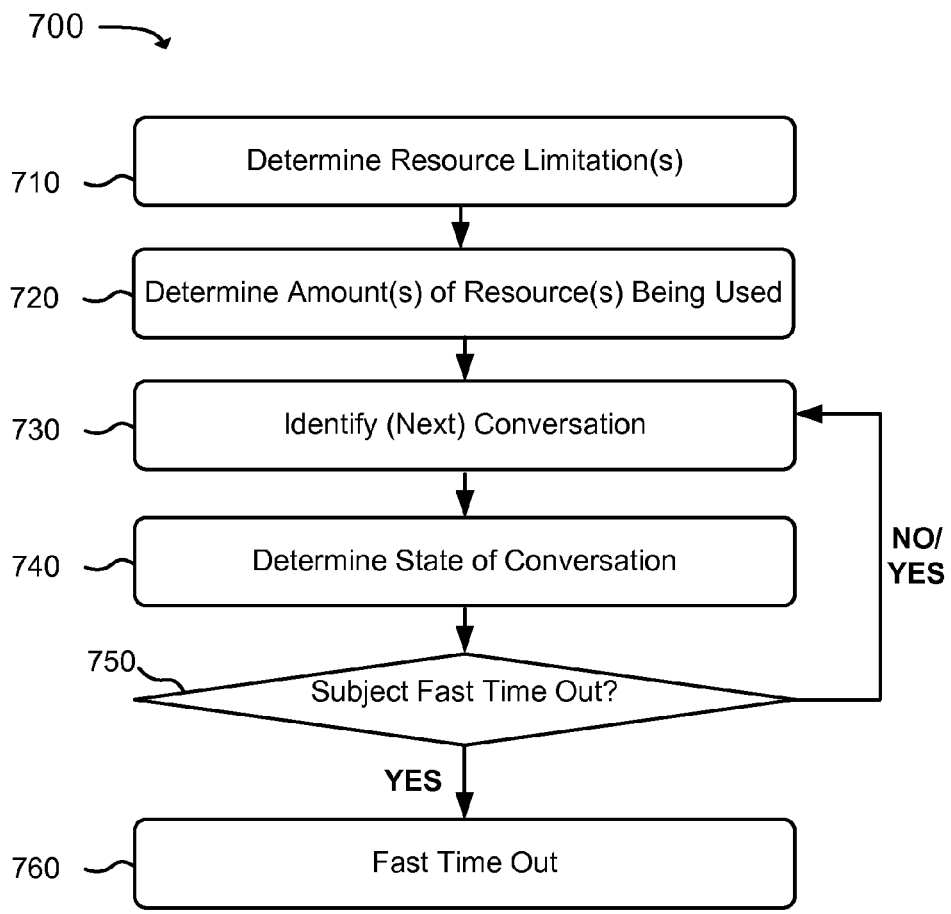
FIG. 7 is a flowchart of an example process for conducting a resource check, during packet transmission, according to implementations described herein.

FIG. 7 is a flowchart of an example process 700 for conducting a resource check according to implementations described herein. Process 700 may be performed independently by request reorder engine 410-1, request reorder engine 410-2, grant reorder engine 420-1, grant reorder engine 420-2, data reorder engine 430-1, and/or data reorder engine 430-2. In one implementation, process 700 of FIG. 7 may correspond to blocks 560 and 570 of FIG. 5. In another implementation, process 700 may also correspond to block 510 of FIG. 5. As discussed above, an enqueue thread, a TO thread, and/or a dequeue thread of a reorder engine may conduct the resource check (process 700). The enqueue thread and the TO thread may conduct the resource check at predefined intervals (e.g., every predefined period of time, every time a first conversation in a round robin is inspected, etc.). The dequeue thread may conduct the resource check whenever the dequeue thread determines that one or more cells were dropped by the reorder engine. In another implementation, a resource check may be conducted when the reorder engine determines that the reorder engine is enqueueing cells faster than dequeueing cells.

Process 700 may include determining resource limitation(s) (block 710). One or more types of resources (e.g., memory to store unordered cells) may be required for a reorder engine to operate properly. Each one of the types of resources may correspond to a resource limitation for the reorder engine. The reorder engine may maintain information about the different resource limitations, including an amount of resource (e.g., free memory) required for each resource limitation and/or how to determine whether the amount is exceeded. The reorder engine may determine the different resource limitations based on the information.

Amount(s) of resource(s) being used may be determined (block 720). For each one of the resource limitations, the reorder engine may determine how much of the corresponding resource (e.g., memory space) is currently being used. The reorder engine may determine whether the amount of resources being used is greater than predefined thresholds set by the resource limitations. In one implementation, the reorder engine may determine to subject one or more conversations to fast time outs when any one of the resource limitations is exceeded. In another implementation, the reorder engine may determine based on a predefined formula, which takes into account the resource limitations and the amount of resources being used, whether a fast time out should be triggered in response to the resource check.

A (next) conversation may be inspected (block 730). After determining that fast time out(s) should be triggered for one or more conversations due to the resource limitations being exceeded, the reorder engine may go through each one of the conversations being processed by the reorder engine. The reorder engine may first identify a first conversation to determine whether the first conversation should be subjected to a fast time out.

A state of the conversation may be determined (block 740). After the reorder engine identifies a conversation, the reorder engine may determine the state of the conversation. The state of the conversation may specify one or more activities (e.g., enqueueing of cells, reordering of cells, fast time out of the conversation, etc.) currently being conducted by the reorder engine that is associated with the conversation.

Thereafter, the reorder engine may determine whether a conversation should be subjected to a fast time out based on the state of the conversation (block 750). The reorder engine may determine to subject the conversation to the fast time out when the state of the conversation meets one of the conditions necessary to trigger a fast time out by a resource check. The conditions may include if new cells are being received for the conversation and/or the conversation is in the process of being timed out (e.g., a normal time out, a fast time out, etc.).

If the state of the conversation meets one of the conditions (block 750—YES), then the conversation may be subject to the fast time out (block 760). Block 760 of FIG. 7 may correspond to block 570 of FIG. 5. Also, the description of blocks 620-650 of FIG. 6 may also correspond to block 760 of FIG. 7. A reorder window size (e.g., 3) may be predefined for when a fast time out is triggered for a conversation by a resource check. A reorder engine may drop one or more blocks at a time and move the reorder pointer until the reorder window size is no longer exceeded for the conversation.

In another implementation, a fast time out triggered by a resource check for a conversation may drop all cells, which have not yet been received by PFE 210 of the reorder engine, between the last ordered cell and the received cell corresponding to the maximum sequence number (i.e., the reorder window size is set to 1). As a result, all the gaps within the conversation are eliminated after the completion of the fast time out.

Regardless of whether a conversation (e.g., the first conversation) is subjected to a fast time out (block 750—NO/YES), the reorder engine may continue to identify a next conversation (e.g., the second conversation) (block 730). The reorder engine may determine whether the next conversation should be subjected to a fast time out triggered by the resource check. Blocks 730-760 of process 700 may be repeated by the reorder engine for each one of the conversations being processed by the reorder engine.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 3 and 5-7, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a first device, first fragments of a first conversation,
   the first fragments being out-of-order;
   reordering, by the first device, the first fragments;
   determining, by the first device, whether a reorder window size is exceeded based on the reordered first fragments;
   subjecting, by the first device and when the reorder window size is exceeded, the first conversation to a first fast time out to drop first missing fragments of the first conversation;
   subjecting, by the first device and while subjecting the first conversation to the first fast time out, a second conversation to a second fast time out to drop second missing fragments of the second conversation;
   preparing, by the first device, a first packet based on the first conversation;
   transmitting, by the first device, the first packet to a second device;
   preparing, by the first device, a second packet based on the second conversation; and
   transmitting, by the first device, the second packet.

2. The method of claim 1, where determining whether the reorder window size is exceeded comprises:
   determining a value of a reorder pointer of the first conversation,
   determining a maximum sequence number of the first fragments,
   determining a difference between the maximum sequence number and the value of the reorder pointer, and
   determining whether the difference is greater than the reorder window size.

3. The method of claim 2, where the reorder pointer corresponds to a sequence number of a last reordered fragment of the first fragments or to a last dropped missing fragment of the first conversation.

4. The method of claim 2, where the maximum sequence number corresponds to a sequence number of a fragment, of the first fragments, with the maximum sequence number.

5. The method of claim 1, where subjecting the first conversation to the first fast time out comprises:
   dropping a first missing fragment of the first missing fragments,
      a sequence number corresponding to the first missing fragment is one greater than a value of a reorder pointer of the first conversation,
   increasing the value of the reorder pointer by one,
   determining that the reorder window size is exceeded again based on the first conversation, and
   dropping a second missing fragment, of the first missing fragments, after determining that the reorder window size is exceeded again.

6. The method of claim 1, where subjecting the second conversation to the second fast time out comprises:
conducting a resource check after determining that one or more of the first missing fragments are dropped,
subject the second conversation to the second fast time out based on the resource check.

7. The method of claim 1, further comprising:
receiving and reordering second fragments of the second conversation while subjecting the first conversation to the first fast time out.

8. The method of claim 1, where subjecting the second conversation to the second fast time out comprises:
determining that the reorder window size is exceeded another time based on the second conversation, and
subjecting the second conversation to the second fast time out after determining that the reorder window size is exceeded the other time and while subjecting the first conversation to the first fast time out.

9. A non-transitory computer-readable medium storing instructions, the instructions comprising:
one or more instructions that, when executed by at least one processor, cause the at least one processor to:
receive first fragments corresponding to a first conversation,
the first fragments being out-of-order;
reorder the first fragments;
determine whether a reorder window size is exceeded based on the first fragments;
subject the first conversation to a first fast time out when the reorder window size is exceeded;
dequeue the reordered first fragments after the first fast time out and during a second fast time out;
determine that one or more first missing fragments corresponding to the first conversation are dropped based on the dequeueing of the reordered first fragments;
conduct a resource check after determining that the one or more first missing fragments are dropped; and
subject a second conversation to the second fast timeout based on the resource check to drop one or more second missing fragments corresponding to the second conversation;
prepare a first packet based on the first conversation;
transmit the first packet;
prepare a second packet based on the second conversation; and
transmit the second packet.

10. The non-transitory computer-readable medium of claim 9, where the one or more instructions to conduct the resource check comprise:
one or more instructions that, when executed by the at least one processor, cause the at least one processor to:
determine a resource limitation,
determine an amount being used of a resource corresponding to the resource limitation,
determine that the amount exceeds the resource limitation, and
identify the second conversation after determining that the amount exceeds the resource limitation.

11. The non-transitory computer-readable medium of claim 9, where the one or more instructions to subject the second conversation to the second fast timeout comprise:
one or more instructions that, when executed by the at least one processor, cause the at least one processor to:
identify the second conversation based on a state corresponding to the second conversation,
the state being at least one of receiving fragments for the second conversation or timing out the second conversation.

12. The non-transitory computer-readable medium of claim 9, where the one or more instructions to determine whether the reorder window size is exceeded comprise:
one or more instructions that, when executed by the at least one processor, cause the at least one processor to:
determine a value of a reorder pointer of the first conversation,
determine a maximum sequence number of the first fragments,
determine a difference between the maximum sequence number and the value of the reorder pointer, and
determine whether the reorder window size is exceeded based on whether the difference is greater than the reorder window size.

13. The non-transitory computer-readable medium of claim 9, where the instructions further comprise:
one or more instructions that, when executed by the at least one processor, cause the at least one processor to:
subject the first conversation to a third fast time out; and
subject a third conversation to a fourth fast time out while subjecting the first conversation to the third fast time out.

14. A first device comprising:
one or more processors to:
receive first fragments corresponding to a first conversations;
receive second fragments corresponding to a second conversation;
reorder the first fragments;
determine whether a reorder window size is exceeded based on the first fragments;
subject the first conversation to a first fast time out when the reorder window size is exceeded to drop first missing fragments of the first conversation;
subject, while subjecting the first conversation to the first fast time out, the second conversation to a second fast time out to drop second missing fragments of the second conversation;
prepare a first packet based on the first conversation;
transmit the first packet to a second device;
prepare a second packet based on the second conversation; and
transmit the second packet.

15. The first device of claim 14, where one or more processors are further to:
reorder the second fragments while subjecting the first conversation to the first fast time out.

16. The first device of claim 14,
where the first device comprises a first packet forwarding engine (PFE), a second PFE, and a third PFE,
where the first PFE comprises the one or more processors,
where the first PFE receives the first fragments from the second PFE, and
where the first PFE receives the second fragments from the third PFE.

17. The first device of claim 14, where, when subjecting the second conversation to the second fast time out, the one or more processors are to:
determine that the reorder window size is exceeded another time based on the second conversation, and
subject the second conversation to the second fast time out after determining that the reorder window size is exceeded the other time.

18. The first device of claim 14, where, when determining whether the reorder window size is exceeded, the one or more processors are to:
- determine a value of a reorder pointer of the first conversation,
- determine a maximum sequence number of the first fragments,
- determine a difference between the maximum sequence number and the value of the reorder pointer, and
- determine whether the difference is greater than the reorder window size.

19. The first device of claim 18,
- where the value of the reorder pointer is equal to a sequence number of a last reordered fragment of the first fragments or to a last dropped missing fragment of the first conversation, and
- where the maximum sequence number is equal to a sequence number of a fragment of the first fragments with the maximum sequence number.

20. The first device of claim 18, where, when subjecting the first conversation to the first fast time out, one or more processors are to:
- continue to operate on the first conversation until a second difference between the maximum sequence number and the value of the reorder pointer is less than or equal to the reorder window size.

* * * * *